United States Patent
Cheon

(10) Patent No.: US 12,406,492 B2
(45) Date of Patent: Sep. 2, 2025

(54) METHOD AND DEVICE FOR TRAINING OBJECT RECOGNIZER

(71) Applicant: HL Klemove Corp., Incheon (KR)

(72) Inventor: Seunghun Cheon, Seongnam-si (KR)

(73) Assignee: HL Klemove Corp., Incheon (KR)

( * ) Notice: Subject to any disclaimer, the term of this patent is extended or adjusted under 35 U.S.C. 154(b) by 378 days.

(21) Appl. No.: 17/961,907

(22) Filed: Oct. 7, 2022

(65) Prior Publication Data

US 2023/0125692 A1    Apr. 27, 2023

(30) Foreign Application Priority Data

Oct. 25, 2021    (KR) ........................ 10-2021-0143049

(51) Int. Cl.
*G06V 10/98*    (2022.01)
*G06V 10/766*    (2022.01)
*G06V 20/58*    (2022.01)

(52) U.S. Cl.
CPC ............ *G06V 10/98* (2022.01); *G06V 10/766* (2022.01)

(58) Field of Classification Search
CPC ...... G06V 10/98; G06V 10/766; G06V 10/82; G06V 20/58; G06V 10/40; G06F 17/18; G06N 3/09
See application file for complete search history.

(56) References Cited

U.S. PATENT DOCUMENTS

| | | | |
|---|---|---|---|
| 10,332,028 B2 * | 6/2019 | Talathi | G06F 18/2148 |
| 11,113,532 B2 * | 9/2021 | Kim | G06N 3/045 |
| 2020/0226426 A1 * | 7/2020 | Jarquin Arroyo | G06F 18/217 |
| 2021/0383553 A1 * | 12/2021 | Guizilini | G06T 7/20 |

FOREIGN PATENT DOCUMENTS

CN    102982336 B    * 11/2015

* cited by examiner

*Primary Examiner* — Stephen R Koziol
*Assistant Examiner* — Dylan J Sherrillo
(74) *Attorney, Agent, or Firm* — Harvest IP Law, LLP

(57) ABSTRACT

The disclosure relates to an object recognizer training method and device. There may be provided a method for training an object recognizer comprising obtaining an image by capturing an object by a first sensor and a second sensor, obtaining first object recognition information by inputting an image captured by the first sensor to a first sensor-based object recognizer and obtaining second object recognition information by inputting an image captured by the second sensor to a second sensor-based object recognizer, detecting an object recognition error in the second sensor-based object recognizer, if the object recognition error is detected, obtaining a predicted value of the second object recognition information corresponding to the first object recognition information based on reference data created before, and training the second sensor-based object recognizer using the predicted value of the second object recognition information.

11 Claims, 4 Drawing Sheets

METHOD AND DEVICE FOR TRAINING OBJECT RECOGNIZER

CROSS-REFERENCE TO RELATED APPLICATION

This application claims priority from Korean Patent Application No. 10-2021-0143049, filed on Oct. 25, 2021, which is hereby incorporated by reference for all purposes as if fully set forth herein.

BACKGROUND

Field

The present embodiments relate to a method and device for training an object recognizer.

Description of Related Art

As the safety regulations of each government for strengthening the safety of automobiles are strengthened, mandatory installation of vehicle safety-related electronic systems is expanding nationwide. An automatic emergency brake system is among them, and this system works for objects ahead at intersections where there is a high chance of accident.

As developed to simulate the human neural structure, an artificial neural network is used to recognize objects around the vehicle. Conventional object recognition technology focused on obtaining data using cameras, but recent research efforts are directed to object recognition by data obtained through lidar or radar or other various sensors as well as cameras. However, developing a new sensor-based artificial neural network requires massive training data and consumes significant costs and time for training.

BRIEF SUMMARY

The present embodiments may provide a method and device for training an object recognizer based on a new sensor.

In an aspect, the present embodiments may provide a method for training an object recognizer comprising obtaining an image by capturing an object by a first sensor and a second sensor, obtaining first object recognition information by inputting an image captured by the first sensor to a first sensor-based object recognizer and obtaining second object recognition information by inputting an image captured by the second sensor to a second sensor-based object recognizer, detecting an object recognition error in the second sensor-based object recognizer, if the object recognition error is detected, obtaining a predicted value of the second object recognition information corresponding to the first object recognition information based on reference data created before, and training the second sensor-based object recognizer using the predicted value of the second object recognition information.

In another aspect, the present embodiments may provide a device for training an object recognizer, comprising an error detector detecting an object recognition error in a second sensor-based object recognizer, based on an object recognition result based on first object recognition information obtained by inputting an image obtained by capturing an object using a first sensor to a first sensor-based object recognizer and an object recognition result based on second object recognition information obtained by inputting an image obtained by capturing the object using a second sensor to the second sensor-based object recognizer, a regression analyzer creating a predicted value of the second object recognition information corresponding to the first object recognition information if the error detector detects the object recognition error, and a trainer training the second sensor-based object recognizer based on the predicted value of the second object recognition information.

According to the present embodiments, it is possible to train an object recognizer being developed based on the results of training a pre-trained object recognizer, thereby saving costs and time necessary for training the object recognizer.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
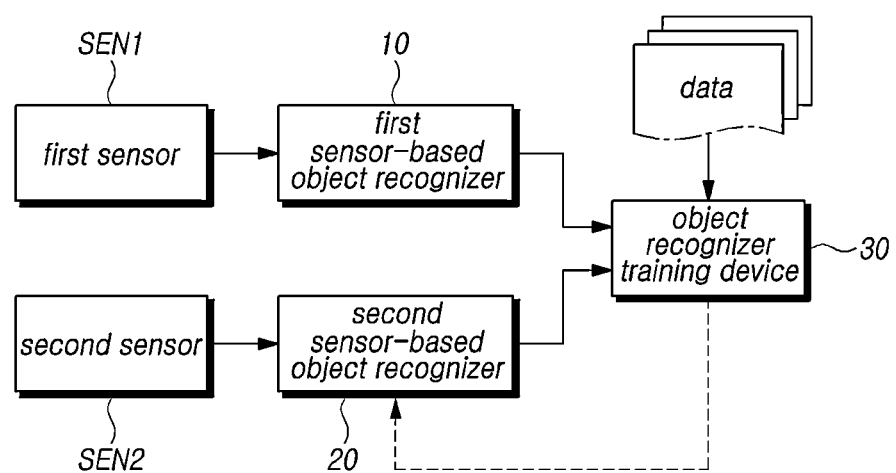
FIG. 1 is a block diagram illustrating an object recognizer training environment according to an embodiment.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a block diagram illustrating an object recognizer training environment according to an embodiment.

Referring to FIG. 1, an object recognizer training environment according to an embodiment may include a first sensor SEN1, a second sensor SEN2, a first sensor-based object recognizer 10 recognizing an object using an image captured by the first sensor SEN1, a second sensor-based object recognizer 20 recognizing the object using an image captured by the second sensor SEN2, and an object recognizer training device 30 training the second sensor-based object recognizer 20.

The first sensor SEN1 and the second sensor SEN2 are image sensors for obtaining an image of an object. For example, the first sensor SEN1 may include a camera, and the second sensor SEN2 may include at least one of a lidar, a radar, or an ultrasonic sensor. For convenience of description, an example in which the first sensor SEN1 is a camera sensor and the second sensor SEN2 is a lidar sensor is described below, but the present embodiments are not limited thereto.

The first sensor-based object recognizer 10, the second sensor-based object recognizer 20, and the object recognizer training device 30 may include an artificial neural network (ANN). The artificial neural network is a model used in machine learning and is a statistical learning algorithm inspired by neural networks in biology (especially the brain in the central nervous system of animals) in machine learning and cognitive science.

The artificial neural network may include a plurality of layers. Each of the layers may include a plurality of neurons (also referred to as 'nodes'). The artificial neural network may include neurons and synapses connecting the neurons. The artificial neural network may refer to all types of models which have problem-solving ability as neurons forming a network through synaptic bonding change the strength of synaptic bonding through learning.

The artificial neural network may be typically defined by three factors as follows: (1) connection pattern between the neurons of different layers; (2) learning process of updating the weight given to the synapse or bias given to the neuron; and (3) activation function of generating the output value from the weighted sum for the input received from the previous layer. The weight and bias are defined as parameters of the artificial neural network.

ANNs may include, but is not limited to, network models, such as the deep neural network (DNN), recurrent neural network (RNN), bidirectional recurrent deep neural network (BRDNN), multilayer perception (MLP), and convolutional neural network (CNN).

The first sensor-based object recognizer 10 may extract features from the image captured by the first sensor SEN1 and recognize objects by obtaining first object recognition information from the extracted features.

The second sensor-based object recognizer 20 may extract features from the image captured by the second sensor SEN2 and recognize objects by obtaining second object recognition information from the extracted features.

Recognizing the object may include classifying the object. Classifying the object may include determining which one of objects pre-registered (or included in the class) the object corresponds to. The first object recognition information and the second object recognition information each represent a score of matching with the feature extracted from the image captured from the sensor. The first sensor-based object recognizer 10 and the second sensor-based object recognizer 20 may recognize the object assigned with the highest score among the objects included in the class, as an object included in the image.

In the present embodiments, the artificial neural network of the first sensor-based object recognizer 10 may be defined as pre-trained one, and the artificial neural network of the second sensor-based object recognizer 20 may be defined as one requiring training. It may be assumed that no error occurs in object recognition by the first sensor-based object recognizer 10. In some cases, an error may occur in object recognition by the second sensor-based object recognizer 20.

The object recognizer training device 30 may receive object recognition results from the first sensor-based object recognizer 10 and the second sensor-based object recognizer 20 to detect an object recognition error in the second sensor-based object recognizer 20. If the object recognition result of the second sensor-based object recognizer 20 does not match the object recognition result of the first sensor-based object recognizer 10, the object recognizer training device 30 may determine that an error occurs in the second sensor-based object recognizer 20.

If detecting an object recognition error in the second sensor-based object recognizer 20, the object recognizer training device 30 may train the second sensor-based object recognizer 20.

The object recognizer training device 30 may include a processor for training the second sensor-based object recognizer 20. The processor of the object recognizer training device 30 may be implemented as one or more software modules, one or more hardware modules, or in various combinations thereof. As an example, the object recognizer training device 30 may be implemented as a single processor or multiple processors. As another example, the object recognizer training device 30 may be implemented as a combination of a processor and a hardware accelerator. As another example, the object recognizer training device 30 may be implemented as a plurality of modules included in different devices. In this case, the plurality of modules may be connected to each other through, e.g., a network.

To train the second sensor-based object recognizer 20, the object recognizer training device 30 may receive the first object recognition information from the first sensor-based object recognizer 10 and estimate a predicted value of the second object recognition information corresponding to the first object recognition information, based on reference data which have been created in the past. The object recognizer training device 30 may train the second sensor-based object recognizer 20 based on the estimated predicted value of the second object recognition information.

Figure 2:
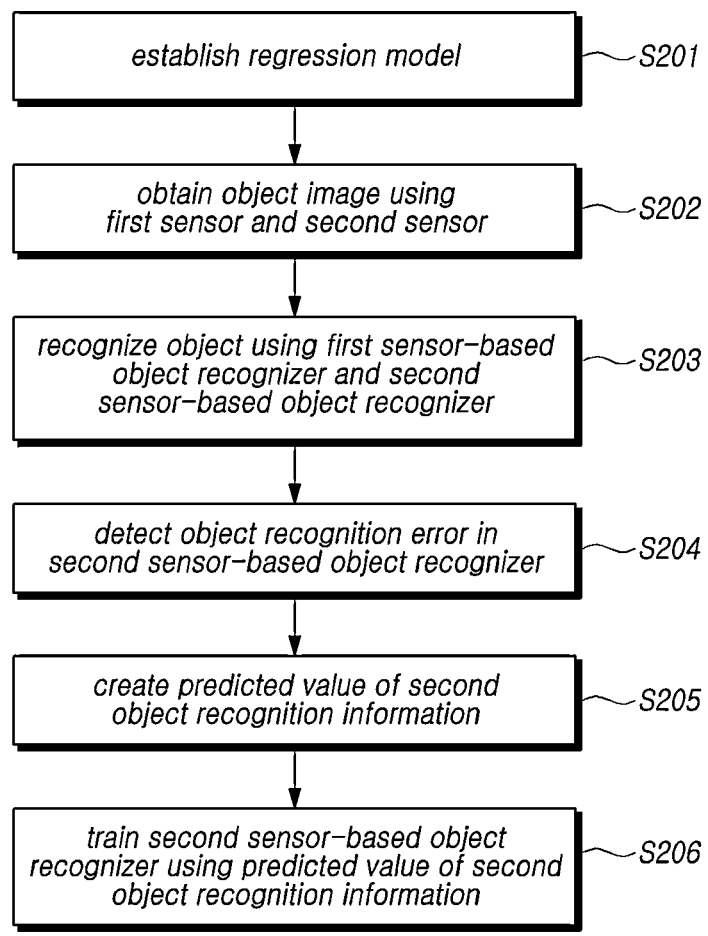
FIG. 2 is a flowchart illustrating an object recognizer training method according to an embodiment.

FIG. 2 is a flowchart illustrating an object recognizer training method according to an embodiment.

Although FIG. 2 divides the object recognizer training method into a plurality of operations, at least some operations may be changed in order, combined with other operations, omitted, or divided into sub-operations, or add one or more operations not shown.

Referring to FIGS. 1 and 2, in step S201, the object recognizer training device 30 may establish a regression model based on a plurality of reference data created in the past.

If no error occurs in the object recognition by the second sensor-based object recognizer 20, e.g., if the object recognition result by the second sensor-based object recognizer is identical to the object recognition result by the first sensor-based object recognizer 10, the reference data may be constituted of a set of the first object recognition information and the second object recognition information used for object recognition.

The reference data may be accumulated in a database. The object recognizer training device 30 may process the reference data accumulated in the database, modeling a regression model that represents the correlation between the first object recognition information and the second object recognition information.

Processing the reference data is described. The object recognizer training device 30 may extract a plurality of information from the reference data. The information extracted from the reference data may include trend information showing the trend of the reference data. The object recognizer training device 30 may perform regression analysis on the change pattern of the reference data using the trend information of the reference data, thereby modeling a regression model that represents the correlation between the first object recognition information and the second object recognition information. To secure the reliability of the regression model, as many pieces of reference data as 100 or more are used to perform modeling.

As an example, the regression model may be represented as a linear regression equation as in Equation 1 below.

$$y = W \times x + b \quad \text{[Equation 1]}$$

Here, x denotes the first object recognition information as the independent variable, y denotes the second object recognition information as the dependent variable, and W and b denote the weight and the bias, respectively.

W and b may be obtained by performing regression learning such that the cost function is minimized. The cost function may be defined as the residual sum of squares (RSS) for the difference between the value of the second object recognition information in the reference data and the predicted value of the second object recognition information obtained from the regression model. The object recognizer training device 30 may update (optimize) W and b by training the regression model to minimize the cost function.

In operation S202, the object is captured by the first sensor SEN1 and the second sensor SEN2 to obtain an image. To train the second sensor-based object recognizer 20, the first sensor SEN1 and the second sensor SEN2 capture the same object to obtain an image.

If the first sensor SEN1 is a camera and the second sensor SEN2 is a lidar, the image obtained through the first sensor SEN1 may be image information, and the image obtained through the second sensor SEN2 may be three-dimensional (3D) spatial data.

In operation S203, the first sensor-based object recognizer 10 may recognize the object using the image captured by the first sensor SEN1, and the second sensor-based object recognizer 20 may recognize the object using the image captured by the second sensor SEN2.

In this case, the first sensor-based object recognizer 10 extracts a feature from the image captured by the first sensor SEN1 and obtains the first object recognition information based on the extracted feature to recognize the object. The second sensor-based object recognizer 20 extracts a feature from the image captured by the second sensor SEN2 and obtains the second object recognition information based on the extracted feature to recognize the object.

The first sensor-based object recognizer 10 may compare the actual value of the first object recognition information with a preset threshold TP1 and, if the actual value of the first object recognition information is larger than TP1, recognize the object. Similarly, the second sensor-based object recognizer 20 may compare the actual value of the second object recognition information with a preset threshold TP2 and, if the actual value of the second object recognition information is larger than TP2, recognize the object.

In step S204, the object recognizer training device 30 may detect an object recognition error in the second sensor-based object recognizer 20.

To that end, the object recognizer training device 30 may receive the object recognition results from the first sensor-based object recognizer 10 and the second sensor-based object recognizer 20. The object recognizer training device 30 compares the object recognition result of the first sensor-based object recognizer 10 with the object recognition result of the second sensor-based object recognizer 20 and, if the object recognition result of the second sensor-based object recognizer 20 does not match the object recognition result of the first sensor-based object recognizer 10, determines that an error occurs in the second sensor-based object recognizer 20.

In step S205, the object recognizer training device 30 may obtain a predicted value of the second object recognition information through the regression model, using the first object recognition information received from the first sensor-based object recognizer 10.

Specifically, the object recognizer training device 30 may obtain the predicted value of the second object recognition information by substituting the first object recognition information received from the first sensor-based object recognizer 10 in Equation 1. The predicted value of the second object recognition information means the correct answer that the second sensor-based object recognizer 20 should infer.

In step S206, the object recognizer training device 30 may train the second sensor-based object recognizer 20 based on the predicted value of the second object recognition information.

As an example, the object recognizer training device 30 may determine a reliable range for the predicted value of the second object recognition information and train the second sensor-based object recognizer 20 so that the second object recognition information created by the second sensor-based object recognizer 20 falls inside the reliable range, updating (optimizing) the parameters (weight and bias) of the artificial neural network of the second sensor-based object recognizer 20.

As another example, the object recognizer training device 30 may perform supervised training on the second sensor-based object recognizer 20, by using the predicted value of the second object recognition information as labeling data. The object recognizer training device 30 may calculate the difference between the actual value of the second object recognition information extracted by the second sensor-based object recognizer 20 and the predicted value of the second object recognition information and train the second sensor-based object recognizer 20 to minimize the difference, updating (optimizing) the parameters (weight and bias) of the artificial neural network of the second sensor-based object recognizer 20. For example, back propagation may be used to train the artificial neural network of the second sensor-based object recognizer 20.

Figure 3:
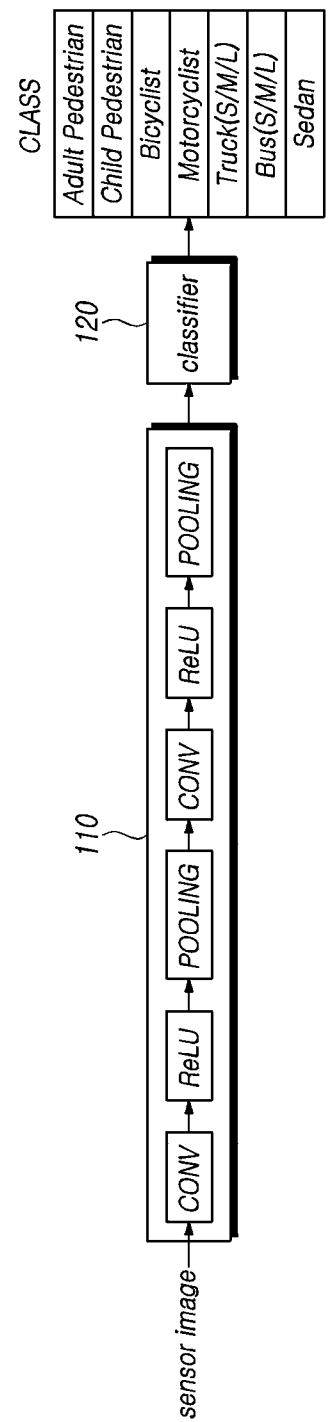
FIG. 3 is a view illustrating an example of an artificial neural network constituting a first sensor-based object recognizer and a second sensor-based object recognizer as shown in FIG. 1.

FIG. 3 is a view illustrating an example of an artificial neural network constituting a first sensor-based object recognizer and a second sensor-based object recognizer as shown in FIG. 1.

Referring to FIG. 3, the artificial neural network of each of the first sensor-based object recognizer and the second sensor-based object recognizer may include a feature extractor 110 and a classifier 120.

The feature extractor 110 may extract a feature from the sensor image obtained through the first sensor (or second sensor). The feature extractor 110 may be configured of at least one convolution layer CONV, at least one non-linearity layer ReLU, and at least one pooling layer POOLING.

The convolution layer CONV may perform a convolution operation for filtering input data using a filter having predetermined size. The convolution layer CONV creates a feature map including features of the input data by performing the convolution operation on the input data using the convolution filter. As a result of the convolution filtering, as many filtered images as the number of the filters included in the convolution layer CONV may be created.

The non-linearity layer ReLU may treat negative values as 0 to realize the input data. The non-linearity layer ReLU outputs 0 if the input data is less than 0 and, if larger than 0, outputs the input value as it is.

The pooling layer POOLING paired with the convolution layer CONV may include the same number of feature maps as the paired convolution layer CONV. The pooling layer POOLING reduces the dimension of the feature map through sampling or pooling.

The classifier 120 may assign a score to each of the objects included in the class according to the degree of matching with the feature expressed in the feature map output from the feature extractor 110. The first sensor-based object recognizer (or the second sensor-based object recognizer) may recognize the object assigned the highest score.

The classifier 120 may include a fully connected layer. The fully connected layer computes the output score of the last layer. The size of the fully connected layer is 1×1×L, and L is the number of objects included in the class of the training data. Objects included in the class may include, e.g., adult pedestrians, child pedestrians, bicyclists, motorcyclists, trucks, buses, sedans, etc. Additionally, trucks and buses may be subdivided into large (L), medium (M), and small (S) according to their size.

Although not shown, the classifier 120 may optionally include a flatten layer interposed between the pooling layer POOLING and the fully connected layer. The flatten layer changes the value of the feature map, which is a matrix form of the pooling layer POOLING, according to the operation node of the fully connected layer, and inputs it.

Figure 4:
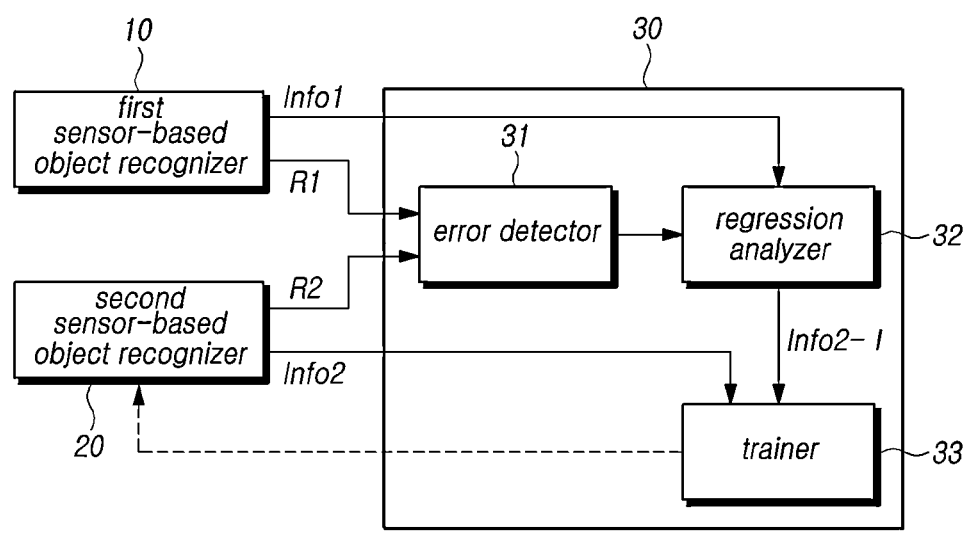
FIG. 4 is a block diagram illustrating an object recognizer training device according to an embodiment.

FIG. 4 is a block diagram illustrating an object recognizer training device according to an embodiment.

In the embodiment shown in FIG. 4, each component may have different functions and capabilities other than those described below. Additional components may be included in addition to those described below.

Referring to FIG. 4, the object recognizer training device 30 according to an embodiment may include an error detector 31 detecting an object recognition error in the second sensor-based object recognizer 20, a regression analyzer 32 estimating a predicted value Info2-I of the second object recognition information corresponding to the first object recognition information Info1 obtained by the first sensor-based object recognizer 10, and a trainer 33 training the second sensor-based object recognizer 20 based on the predicted value Info2-I of the second object recognition information.

The error detector 31 may receive the object recognition result R1 from the first sensor-based object recognizer 10 and the object recognition result R2 from the second sensor-based object recognizer 20 to detect an object recognition error in the second sensor-based object recognizer 20.

The error detector 31 compares the object recognition result R1 of the first sensor-based object recognizer 10 with the object recognition result R2 of the second sensor-based object recognizer 20 and, if the object recognition result R2 of the second sensor-based object recognizer 20 does not match the object recognition result R1 of the first sensor-based object recognizer 10, determines that an error occurs in the second sensor-based object recognizer 20.

As an example, if the object recognition result R1 of the first sensor-based object recognizer 10 is a bicycle, and the object recognition result R2 of the second sensor-based object recognizer 20 is a motorcycle, the error detector 31 determines that an error occurs in the object recognition by the second sensor-based object recognizer 20. As another example, if the object recognition result R1 of the first sensor-based object recognizer 10 is a child pedestrian, and the object recognition result R2 of the second sensor-based object recognizer 20 is a null (which means that no object is recognized), the error detector 31 determines that an error occurs in the object recognition by the second sensor-based object recognizer 20.

The error detector 31 may output error data upon determining that an error occurs in the object recognition by the second sensor-based object recognizer 20.

The regression analyzer 32 may receive the first object recognition information Info1 from the first sensor-based object recognizer 10 and, in response to the error data output from the error detector 31, estimate the predicted value Info2-I of the second object recognition information based on the first object recognition information Info1. The regression analyzer 32 performs an operation for estimating the predicted value Info2-I of the second object recognition information if an error occurs in the object recognition by the second sensor-based object recognizer 20.

The regression analyzer 32 may include a regression model to estimate the predicted value Info2-I of the second object recognition information. The regression analyzer 32 may estimate the predicted value Info2-I of the second object recognition information corresponding to the first object recognition information Info1 through the regression model, using the first object recognition information Info1 obtained by the first sensor-based object recognizer 10.

The trainer 33 may train the second sensor-based object recognizer 20 based on the predicted value Info2-I of the second object recognition information provided from the regression analyzer 32.

As an example, the trainer 33 may detect whether the second object recognition information Info2 extracted by the second sensor-based object recognizer 20 falls outside the reliable range of the predicted value Info2-I of the second object recognition information and, upon determining that the second object recognition information Info2 falls outside the reliable range, train the second sensor-based object recognizer 20 so that the second object recognition information Info2 falls inside the reliable range, updating (optimizing) the parameters (weight and bias) of the second sensor-based object recognizer 20.

As another example, the trainer 33 may perform supervised training on the second sensor-based object recognizer 20 using the predicted value Info2-I of the second object recognition information as labeling data. The predicted value Info2-I of the second object recognition information means the correct answer that the second sensor-based object recognizer 20 should infer.

The trainer 33 may calculate the difference between the actual value Info2 of the second object recognition information extracted by the second sensor-based object recognizer 20 and the predicted value Info2-I of the second object recognition information and train the artificial neural network of the second sensor-based object recognizer 20 to minimize the difference, updating (optimizing) the parameters (weight and bias) of the second sensor-based object recognizer 20.

According to the present embodiments, it is possible to reduce costs and time required for training the second sensor-based object recognizer 20 by training the second sensor-based object recognizer 20 using the results of training by the pre-trained first sensor-based object recognizer 10.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A method for training an object recognizer, the method comprising:
    obtaining an image by capturing an object by a first sensor and a second sensor;
    obtaining first object recognition information by inputting an image captured by the first sensor to a first sensor-based object recognizer and obtaining second object recognition information by inputting an image captured by the second sensor to a second sensor-based object recognizer;
    detecting an object recognition error in the second sensor-based object recognizer;
    if the object recognition error is detected, obtaining a predicted value of the second object recognition information corresponding to the first object recognition information based on reference data created before; and
    training the second sensor-based object recognizer using the predicted value of the second object recognition information,
    wherein the predicted value of the second object recognition information is obtained by a regression model representing a relationship between the first object recognition information and the second object recognition information,
    wherein the regression model is represented by an equation in which the second object recognition information corresponds to a value obtained by multiplying the first object recognition information by a weight and adding a bias value,
    wherein the weight and the bias value are updated by training the regression model to minimize a cost function defined as a residual sum of squares (RSS) for the difference between a value of the second object recognition information in the reference data and the predicted value of the second object recognition information obtained from the regression model.

2. The method of claim 1, wherein detecting the object recognition error in the second sensor-based object recognizer includes determining whether an object recognition result of the second sensor-based object recognizer based on the second object recognition information matches an object recognition result of the first sensor-based object recognizer based on the first object recognition information.

3. The method of claim 1, wherein the reference data includes a set of the first object recognition information obtained by the first sensor-based object recognizer and the second object recognition information obtained by the second sensor-based object recognizer, if the object recognition error in the second sensor-based object recognizer is not detected.

4. The method of claim 3, wherein the predicted value of the second object recognition information is a result derived by extracting trend information representing a trend of the reference data, performing regression analysis on a change pattern of the reference data using the trend information to model the regression model.

5. The method of claim 1, wherein training the second sensor-based object recognizer includes:
    determining a reliable range of the predicted value of the second object recognition information;
    detecting whether an actual value of the second object recognition information obtained by the second sensor-based object recognizer falls outside the reliable range; and
    if the actual value falls outside the reliable range, updating a parameter of the second sensor-based object recognizer so that the actual value falls inside the reliable range.

6. The method of claim 1, wherein training the second sensor-based object recognizer includes:
    calculating a difference between an actual value of the second object recognition information obtained by the second sensor-based object recognizer and the predicted value of the second object recognition information; and
    updating a parameter of the second sensor-based object recognizer so that the difference is minimized.

7. A device for training an object recognizer, comprising:
    a processor configured to:
        detect an object recognition error in a second sensor-based object recognizer, based on an object recognition result based on first object recognition information obtained by inputting an image obtained by capturing an object using a first sensor to a first sensor-based object recognizer and an object recognition result based on second object recognition information obtained by inputting an image obtained by capturing the object using a second sensor to the second sensor-based object recognizer;

create a predicted value of the second object recognition information corresponding to the first object recognition information if the error detector detects the object recognition error; and train the second sensor-based object recognizer based on the predicted value of the second object recognition information, wherein the predicted value of the second object recognition information is obtained by a regression model representing a relationship between the first object recognition information and the second object recognition information, wherein the regression model is represented by an equation in which the second object recognition information corresponds to a value obtained by multiplying the first object recognition information by a weight and adding a bias value, wherein the weight and the bias value are updated by training the regression model to minimize a cost function defined as a residual sum of squares (RSS) for the difference between a value of the second object recognition information in the reference data and the predicted value of the second object recognition information obtained from the regression model.

8. The device of claim 7, wherein the processor is configured to:

extract trend information representing a trend of reference data created before;

perform regression analysis on a change pattern of the reference data using the trend information to model the regression model; and obtain the predicted value of the second object recognition information from the regression model by inputting the first object recognition information to the regression model.

9. The device of claim 7, wherein the processor is configured to:

detect whether an actual value of the second object recognition information obtained by the second sensor-based object recognizer falls outside a reliable range of the position sensing value; and upon determining that the actual value falls outside the reliable range, update a parameter of the second sensor-based object recognizer so that the actual value falls inside the reliable range.

10. The device of claim 7, wherein the processor is configured to:

calculate a difference between an actual value of the second object recognition information obtained by the second sensor-based object recognizer and the predicted value of the second object recognition information; and update a parameter of the second sensor-based object recognizer so that the difference is minimized.

11. The device of claim 7, wherein the first sensor includes a camera, and the second sensor includes any one of a radar, a lidar, or an infrared (IR) sensor.

* * * * *